United States Patent Office 2,970,130
Patented Jan. 31, 1961

2,970,130
CATALYSTS FOR GLYCIDYL POLYETHERS, PRODUCTS PRODUCED THEREBY AND METHOD OF PRODUCING SAID CATALYSTS

Arnold B. Finestone, West Newton, Mass., assignor to Westinghouse Electric Corporation, East Pittsburgh, Pa., a corporation of Pennsylvania No Drawing. Filed Jan. 7, 1958, Ser. No. 707,468

8 Claims. (Cl. 260—47)

The present invention relates to a process for curing glycidyl polyethers to form hardened resins particularly well adapted for use as electrical insulation, to the products produced thereby, and to the method of preparing catalyst for use in said process.

Glycidyl polyethers, also known as epoxy resins, have excellent chemical resistance low moisture absorption and superior adhesive properties all of which make said resins particularly well suited for use as adhesive sealing compounds, casting resins and surface coatings. Generally, glycidyl polyethers have been cured to hard resins by heating the same in the presence of catalytic amounts of an amine or an acid anhydride. Numerous disadvantages have resulted from such prior art curing practices.

The amine type catalysts, such as diethylene-triamine and dimethylamine, are extremely fast acting catalysts when used in association with glycidyl polyethers. As a result, such resins must be used almost immediately after the catalyst has been admixed therewith. Any unused catalyzed resinous mixture remaining after about an hour after mixing, must be discarded to prevent the same from hardening within the mixing container. Furthermore, many of the amines which have been used heretofore may cause severe dermatitis or are toxic, and certain of them have quite unpleasant odors, and are quite volatile. A particularly critical shortcoming resides in the use of conventional amine cured epoxy resins in electrical applications, especially at elevated temperatures.

Of the acid anhydride materials which may be used, maleic anhydride and phthalic anhydride have enjoyed the most widespread acceptance as curing catalysts for epoxy resins. Like the amine catalysts, however, the acid anhydrides when admixed with epoxy resins provide liquid mixtures having a relatively short shelf life. A further disadvantage of acid anhydride catalysts lies in the fact that they must be admixed with the resins at elevated temperatures to insure complete solution therein. On subsequent cooling, however, precipitation of the catalytic material frequently occurs. Other disadvantages inherent in the catalyzing of epoxy resin with acid anhydrides are known to those in the art.

The object of the present invention is to provide mixtures of glycidyl polyethers and curing catalysts comprising at least one N-substituted diethanolamine boronate ester which mixtures are stable for prolonged periods of time at room temperature and will react readily at elevated temperatures to provide cured resinous products.

Another object of this invention is to provide a process for curing glycidyl polyethers by heating the same at elevated temperatures in the presence of a curing catalyst comprising at least one N-substituted diethanolamine boronate ester.

A further object of this invention is to provide electrical members insulated with a resinous glycidyl polyether and at least one N-substituted diethanolamine boronate ester.

A further object of this invention is to provide a process for producing N-substituted diethanolamine boronate esters.

Other and further objects of the invention will, in part, be obvious and will, in part, appear hereinafter.

Broadly, the foregoing objects are attained in accordance with the present invention by mixing reactive glycidyl polyethers with a curing catalytic composition comprising at least one N-substituted diethanolamine boronate ester. The mixture is highly stable at room temperatures, yet will cure rapidly at temperatures within the range of from 100° C. to 200° C. The resinous products thus obtained are hard and tough and have excellent electrical properties.

More specifically, this invention provides a process which comprises admixing a glycidyl polyether with from about 4% to 40% by weight, based on the weight of the glycidyl polyether, of at least one N-substituted diethanolamine boronate ester, said mixture being stable on being stored or shipped for long periods of time at room temperatures, and heating the mixture at temperatures within the range of from about 100° C. to about 200° C. or even higher to produce a hard, cured resinous product.

Mixtures of glycidyl polyethers in combination with the curing agents of this invention have extremely long shelf life at room temperatures. That is, they do not gel even after several months' storage at room temperature (20° C. to 30° C.) yet will cure to the solid state after only a few hours heating at 135° C. or after having been heated to a temperature of 200° C. for a period of about one hour.

The N-substituted diethanolamine boronate esters of this invention include those materials having the following structural formula

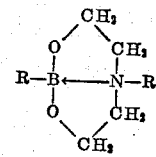

wherein R may be an alkyl radical including for example, methyl, ethyl, propyl, isopropyl, butyl and isobutyl; a cycloalkyl group including for example, cyclopentyl and cyclohexyl; an aryl group including for example, phenyl, halogenated phenyl, such as p-chlorophenyl, methyl-phenyl, and benzyl, and R' may be the hydrogen radical or any one of the above listed R radicals.

The N-substituted diethanolamine boronate esters of this invention are prepared by the reaction of one mol of a boronic acid and one mol of an N-substituted diethanolamine.

Boronic acids are well known in the art and may be represented by the following structural formula

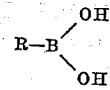

wherein R represents an alkyl radical including for example, methyl, ethyl, propyl, isopropyl, butyl and isobutyl; a cycloalkyl group including for example, cyclopentyl and cyclohexyl; an aryl group including for example, phenyl, halogenated phenyl, methyl-phenyl and benzyl.

N-substituted diethanolamines have the structural formula

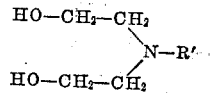

wherein R' represents the hydrogen radical, an alkyl radical such, for example, as methyl, ethyl, propyl, isopropyl, butyl and isobutyl; a cycloalkyl group including, for example, cyclopentyl and cyclohexyl; an aryl group such, for example, as phenyl, methyl-phenyl and benzyl.

In carrying out the reaction in accordance with this invention the boronic acid and the N-substituted diethanolamine are admixed with at least 5% by weight, based on the total weight of the reactants, of a water-entrainer or azeotropizer, such, for example, as benzene, toluene and xylene. The mixture is then refluxed with stirring until two mols of water are removed by azeotropic distillation. This may be accomplished by use of a Dean Stark trap. The water-entrainer is then removed by heating under reduced pressure. Heating at a reduced pressure is done to prevent the possibility of overheating the mixture which might possibly have adverse effects on the reaction product. The reaction product, an N-substituted diethanolamine ester of the boronic acid will be a solid or a liquid depending on the reactants employed. It has been found desirable to purify the solid reaction products by any conventional means such, for example, as recrystallization from a solvent such as acetone.

The following examples are illustrative of the preparation of N-substituted diethanolamine boronate esters suitable for use in this invention.

EXAMPLE I

The following materials are charged into a one liter, three-neck flask equipped with a motor driven stirrer, thermometer, Dean Stark moisture trap with water-jacketed condenser:

Phenylboronic acid _____ 61 grams (0.5 mol).
N-methyldiethanolamine _____ 59.5 grams (0.5 mol).
Benzene _____ 500 milliliters.

The mixture is refluxed at a temperature of about 80.1° C. (the boiling point of benzene) until about 2 mols of water are removed. The time required for the removal of 2 mols of water will ordinarily be from about 10 to 12 hours. The benzene is then removed by heating the mixture at a reduced pressure. A crude solid residue remains which is dissolved in hot acetone and filtered.

The filtered solution is then cooled overnight in the deep-freeze compartment of a refrigerator. Needle-like crystals are produced and are removed from the acetone by filtration. The crystals are further purified by recrystallization to produce white needle-like crystals having a melting point of from about 115.8° C.–116.2° C. This product may be represented by the following structural formula

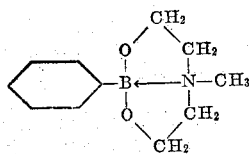

EXAMPLE II

The following materials were charged into the flask employed in Example I.

Phenylboronic acid _____ 40 grams (0.33 mol).
N-ethyldiethanolamine _____ 44 grams (0.33 mol).
Benzene _____ 500 milliliters.

The method of Example I was employed to produce needle-like crystals having a melting point in the range of 83.5° C.–83.9° C. This product may be represented by the following formula

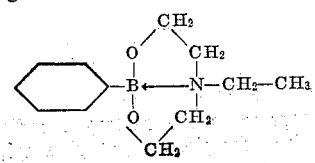

EXAMPLE III

The following materials were charged into a flask with attachments similar to that employed in Example I.

Phenylboronic acid _____ 61 grams (0.5 mol).
N-phenyldiethanolamine _____ 92.5 grams (0.5 mol).
Benzene _____ 500 milliliters.

The method of Example I was employed to produce a viscous liquid which could not be crystallized. This product may be represented by the following structural formula

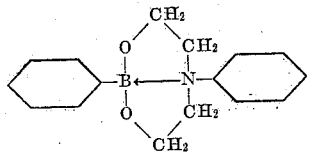

EXAMPLE IV

The following materials were charged into a flask with attachments, similar to that employed in Example I.

n-Butylboronic acid _____ 40 grams (0.41 mol).
N-methyldiethanolamine _____ 48.5 grams (0.41 mol).
Benzene _____ 500 milliliters.

The procedure of Example IV was employed and the resulting product was a liquid having a melting point in the range of 15° C.–16° C. This product may be represented by the following structural formula

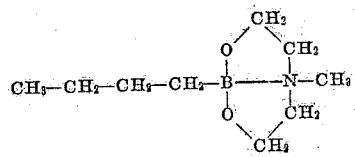

In preparing the resinous compositions of this invention according to one preferred procedure, there is employed, a resinous polymeric epoxide or glycidyl polyether. Such epoxides or glycidyl polyethers may be obtained by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example, as 4,4'-dihydroxy-diphenyl-dimethyl-methane (referred to hereinafter as bis-phenol "A"), 4,4'-dihydroxy-diphenyl-methyl-methane and 4,4'-dihydroxy-diphenyl-methane. In admixture with the named polynuclear phenols, use also may be made of those polynuclear phenols wherein the phenol nuclei are joined by sulfur bridges, such for example as 4,4'-dihydroxy-diphenyl-sulfone. Examples of suitable polyhydric alcohols are glycerol, propylene glycol and 1,5-pentanediol.

While it is preferred to use epichlorohydrin as the epihalohydrin in the preparation of the resinous polymeric expoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The product of the reaction, instead of being a single simple compound, is generally a complex mixture of glycidyl polyethers, but the principal product may be represented by the formula

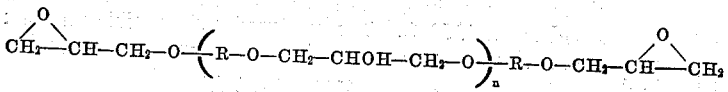

where $n$ is an integer of the series 0, 1, 2, 3 . . . , and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol suitable for use in this invention, has a 1,2-epoxy equivalency greater than 1.0. By epoxy equivalency reference is made to the average number of 1,2-epoxy groups

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

The 1,2 epoxide value of the glycidyl polyether is determined by heating a weighed sample of the ether with an excess of 0.2 N pyridinium chloride in chloroform solution at the boiling point under reflux for 2 hours whereby the pyridinium chloride hydrochlorinates the epoxy groups to chlorohydrin groups. After cooling, the excess pyridinium chloride is back-titrated with 0.1 N sodium hydroxide in methanol to the phenolphthalein end point.

Resinous polymeric epoxides or glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

The N-substituted diethanolamine boronate esters will dissolve in the glycidyl polyethers and form homogeneous compositions. In some instances, the application of a small amount of heat to the mixture may be required to completely dissolve the catalyst in the glycidyl polyether. The resultant compositions may be stored for several months at room temperatures without any appreciable increase in viscosity. It is a particularly important feature of this invention, that when the catalyzed polyether mixture is subjected to elevated temperatures of from about 100° C. to 200° C. and higher, the polyether-catalyst mixture readily reacts to form hard, tough, cured resinous products. Such products exhibit low electrical losses over substantially all temperatures at which apparatus containing such products may reasonably operate.

Glycidyl polyethers catalyzed with the curing catalyst of this invention are particularly suitable for electrical insulating applications. Thus, the mixture of glycidyl polyethers and curing catalysts may be applied to electrical wires, cables, coils, windings and the like as potting, impregnating and coating resins and varnishes. Upon being subjected to heat, any volatile solvent which may be present in the polyether-curing catalyst mixture evaporates and the liquid polyether cures to a hard, tough resinous mass. It should be understood that no solvent need be present since liquid epoxy resins are available and can be used. These catalyzed glycidyl polyether compositions also may be employed for potting and casting applications. Laminated magnetic cores, for example, may be dipped in such liquid compositions, using vacuum and pressure if necessary, and the composition will readily fill all of the spaces between laminations. On heating, the composition between the laminations cures to a hard, tough, adhesive binder holding the laminations in position to produce a solid core which is extremely resistant to delamination and may be cut into core segments without rupture. Electrical transformers, rectifiers and electronic components of various kinds may be potted or cast within the completely reactive catalyzed glycidyl polyether compositions of this invention.

The compositions comprising the epoxy resin, and the catalyst of this invention are excellent adhesives. Thin coatings may be applied to metal, wood, porcelain, paper, plastics such as phenolic laminates, and when the coated surfaces are superimposed and subjected to moderate pressures and heated to temperatures of 100° C. to 200° C. unusually good bond is obtained.

Glycidyl polyethers which are cured using the catalyst of this invention may be admixed with solids such as silica, hydrated alumina, titanium dioxide, glass fibers, wood flour, mica, graphite and calcium silicate. In some instances small amounts up to 50% of the weight of the composition of other resins, such as phenolics, polyesters such as glycol maleates, and alkyd resins, may be admixed with the glycidyl polyethers in the practice of the present invention.

In order to indicate even more specifically the advantages and capabilities of the curing catalytic mixture of the present invention, the following specific examples are set forth. The parts given are by weight unless otherwise indicated.

EXAMPLE V

A glycidyl polyether is prepared by introducing into a reaction vessel equipped with agitator, cooling and heating means, distillation condenser and receiver, 513 parts (2.25 mols) of bis-phenol "A" and 208.1 parts (2.25 mols) of epichlorohydrin and 10.4 parts of water. A total of 188 parts of 97.5% sodium hydroxide, corresponding to 2.04 mols (2% excess) per mol of epichlorohydrin, is added in increments over several hours. The temperature in the vessel does not rise above 100° C. and is generally not above 95° C. After all the sodium hydroxide is added, the excess water and epichlorohydrin is removed by evacuating to an absolute pressure of 50 mm. of mercury at 150° C. The vessel is then cooled to 90° C. and 36 parts of benzene added, and then cooled further to 40° C. with salt precipitating from the solution. The solution is filtered to remove the salt, the salt being washed with 36 additional parts of benzene, the benzene washing out any polyether resin and then being added to the filtrate and both returned to the vessel. The benzene is then distilled off, the polyether resin being heated at an increasing temperature until at 125° C. vacuum is applied and distillation is continued until the vessel contents are at 170° C. at 25 mm. of mercury absolute pressure. The glycidyl polyether had a viscosity of Z-3 on the Gardner-Holdt scale.

EXAMPLE VI

To 200 part of the glycidyl polyether prepared as described in Example V, there are added 14 parts of N-methyldiethanolamine phenylboronate with stirring. The mixture mains its viscosity at room temperature for a period in excess of one month. The mixture gels in less than three-quarters of an hour when heated to a temperature of 135° C. At a temperature of 200° C. the mixture gels in less than one-half of an hour, and the catalyzed glycidyl polyether attains a Shore hardness of about 78 on the D scale within three hours after gelation.

In the following Table I is an extensive list of the electrical properties of the Example VI catalyzed resin. For these tests, plate castings, 4″ x 4″ x ⅛″, were used. It should be noted that greatly improved, acceptable electrical properties are reached eight hours after gelation when heated at 135° C. and higher.

*Table I*

| Plate Casting Nos. | Baked at | Test Temp., °C. | Power Factor 100 × tan | | Dielectric Constant | |
|---|---|---|---|---|---|---|
| | | | 60 Cy. | 1 Kcy. | 60 Cy. | 1 Kcy. |
| 1 | 4 hrs., 135° C | 23 | 0.28 | 0.33 | 3.62 | 3.62 |
| | | 103 | 11.95 | 6.06 | 5.47 | 4.83 |
| | | 149 | 91.3 | 16.01 | 8.45 | 5.57 |
| 2 | 8 hrs., 135° C | 23 | 0.23 | 0.32 | 3.54 | 3.54 |
| | | 103 | 2.50 | 1.54 | 3.98 | 3.85 |
| | | 149 | 17.65 | 5.32 | 4.83 | 4.33 |
| 3 | 12 hrs., 135° C | 23 | 0.25 | 0.35 | 3.51 | 3.49 |
| | | 103 | 1.07 | 0.77 | 3.74 | 3.70 |
| | | 149 | 7.08 | 2.20 | 4.11 | 3.92 |
| 4 | 16 hrs., 135° C | 23 | 0.29 | 0.37 | 3.41 | 3.41 |
| | | 103 | 1.50 | 0.71 | 3.74 | 3.68 |
| | | 149 | 9.42 | 2.73 | 4.20 | 3.93 |
| 5 | 24 hrs., 135° C | 25 | 0.32 | 0.44 | 3.54 | 3.51 |
| | | 100 | 0.64 | 0.49 | 3.72 | 3.67 |
| | | 150 | 3.55 | 1.50 | 4.02 | 3.98 |
| 5 reheated | 24 hrs., 135° C | 25 | 0.41 | 0.47 | 3.57 | 3.55 |
| | | 100 | 0.69 | 0.56 | 3.72 | 3.67 |
| | | 150 | 3.31 | 1.25 | 4.01 | 3.90 |
| 5 reheated again. | 24 hrs., 150° C | 25 | 0.42 | 0.45 | 3.46 | 3.45 |
| | | 100 | 0.59 | 0.68 | 3.73 | 3.66 |
| | | 150 | 5.07 | 1.68 | 4.15 | 3.99 |

EXAMPLE VII

To 100 parts of the glycidyl polyether prepared as described in Example V, there are added 7 parts of N-ethyldiethanolamine phenyl boronate with stirring. The catalyzed resin gelled in 2 hours at 200° C. and in 2½ hours at 135° C. The catalyzed resin exhibited a tank life in excess of one month.

EXAMPLE VIII

To 100 parts of the glycidyl polyether of Example V, there are added 7 parts of N-methyldiethanolamine n-butylboronate with stirring. The catalyzed resin gelled in three-quarters of an hour at 200° C. and in one hour at 135° C. The catalyzed resin had a shelf life of at least one month.

The following table is a list of electrical properties of the above resin systems. Plate castings, 4″ x 4″ x ⅛″, were used.

*Table II*

| Resin of Example | Curing Cycle | Test Temp., °C. | Power Factor 100×tan | | Dielectric Constant | |
|---|---|---|---|---|---|---|
| | | | 60 Cy. | 1 Kcy. | 60 Cy. | 1 Kyc. |
| VII | 24 hrs. at 135° C | 27 | 0.31 | 0.33 | 3.44 | 3.42 |
| | | 101 | 5.72 | 5.38 | 5.26 | 4.78 |
| | | 150 | 41.15 | 5.66 | 5.88 | 5.10 |
| VIII | 24 hrs. at 135° C | 28 | 0.54 | 0.45 | 3.55 | 3.53 |
| | | 100 | 0.95 | 0.96 | 3.80 | 3.76 |
| | | 150 | 34.7 | 8.08 | 5.52 | 4.77 |

In the following table there are shown data obtained in various gel times at different temperatures.

*Table III*

| Composition of Example | Temperature, °C. | Gel Times in Hours | Shore Hardness D Scale |
|---|---|---|---|
| VI | 135 | less than 1 | 88 |
| | 150 | less than ½ | 89 |
| | 200 | do | 88 |
| VII | 135 | less than 2½ | 82 |
| | 150 | less than 2 | 84 |
| | 200 | do | 85 |
| VIII | 135 | less than ¾ | 85 |
| | 150 | do | 85 |
| | 200 | less than 1 | 83 |

EXAMPLE IX

A transformer is impregnated with a quantity of the catalyzed glycidyl polyether mixture of Example VII. The composition is applied to the transformer in an impregnation tank under pressure. After curing at a temperature of 135° C. for about eight hours, the transformer is completely impregnated with a tough, hard resin having excellent electrical insulating properties.

EXAMPLE X

A copper wire conductor is wrapped with glass cloth serving in a conventional manner and the wrapped conductor is impregnated with the catalyzed epoxy resin of Example VII dissolved in a suitable volatile solvent. The volatile solvent is removed by heating and the impregnated wrapped conductor is heated for about eight hours at 135° C. to provide an insulated electrical conductor. The insulated conductor has good electrical insulating properties and high physical properties. It will be understood that the electrical conductor can be wrapped with other inorganic material besides the glass serving above mentioned. Examples being glass cloth, asbestos fibers and asbestos cloth. The catalyzed resin composition of this invention may also be applied directly to the electrical conductor if so desired.

To the catalyzed glycidyl polyether mixtures of this invention, there may be added from 0.1% to 5% by weight, based on the weight of the glycidyl polyether, of a catalyst activator such, for example, as metal chelate compounds and alkyl halides. Examples of suitable metal chelates are chromium acetylacetonate, nickel acetylacetonate, cobalt salicyaldehyde, and copper salicyaldehyde. Examples of suitable alkyl halides are methyl iodide, ethyl iodide, methyl bromide and ethyl bromide. These additions enable the glycidyl polyethers to cure more rapidly at temperatures of 100° C. and higher.

While the present invention has been described with reference to particular embodiments thereof, it will be understood, of course, that certain changes, modifications and substitutions may be made therein without departing from its scope.

I claim as my invention:

1. A composition of matter comprising (1) a reactive glycidyl polyether derived from an epihalohydrin and a polyhydric compound selected from the group consisting of polyhydric alcohols and polyhydric phenols and (2) a curing catalyst therefor comprising from 4% to 40% by weight, based on the weight of the polyether, of at least one N-substituted diethanolamine boronate ester having the structural formula

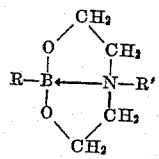

wherein R represents a radical selected from the group consisting of alkyl radicals having from 1 to 4 carbon atoms, phenyl, halogenated phenyl, methyl-phenyl, benzyl, cyclopentyl, and cyclohexyl radicals, and R' represents a radical selected from the group consisting of hydrogen, alkyl radicals having from 1 to 4 carbon atoms, phenyl, halogenated phenyl, methyl-phenyl, benzyl, cyclopentyl, and cyclohexyl radicals.

2. A composition of matter comprising a reactive glycidyl polyether derived from an epihalohydrin and a polyhydric compound selected from the group consisting of polyhydric alcohols and polyhydric phenols, said polyether having a 1,2-epoxy equivalency of greater than 1, having admixed therewith about 4% to 40% by weight, based on the weight of the polyether, of at least one N-substituted diethanolamine boronate ester having the structural formula

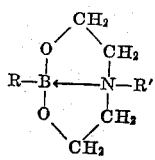

wherein R represents a radical selected from the group consisting of alkyl radicals having from 1 to 4 carbon atoms, phenyl, halogenated phenyl, methyl-phenyl, benzyl, cyclopentyl, and cyclohexyl radicals, and R' represents a radical selected from the group consisting of hydrogen, alkyl radicals having from 1 to 4 carbon atoms, phenyl, halogenated phenyl, methyl-phenyl, benzyl, cyclopentyl, and cyclohexyl radicals.

3. The process of producing a resinous product which comprises admixing a glycidyl polyether derived from an epihalohydrin and a polyhydric compound selected from the group consisting of polyhydric alcohols and polyhydric phenols with from 4% to 40% by weight, based on weight of the polyether, of at least one N-substituted diethanolamine boronate ester having the structural formula

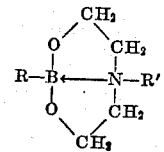

wherein R represents a radical selected from the group consisting of alkyl radicals having from 1 to 4 carbon atoms, phenyl, halogenated phenyl, methyl-phenyl, benzyl, cyclopentyl, and cyclohexyl radicals, and R' represents a radical selected from the group consisting of hydrogen, alkyl radicals having from 1 to 4 carbon atoms, phenyl, halogenated phenyl, methyl-phenyl, benzyl, cyclopentyl, and cyclohexyl radicals, and heating the mixture at temperatures within the range of from about 100° C. to about 200° C. to produce a hard, cured resinous product.

4. The process of claim 3 wherein the glycidyl polyether is the product obtained by reacting 2,2-bis(4-hydroxyphenyl) propane and epichlorohydrin in an alkaline medium.

5. The cured epoxy resin produced by the process of claim 3.

6. Process of claim 3, wherein the resinous mixture is heated at least eight hours at 135° C. to provide improved electrical loss properties.

7. An insulated electrical member comprising an electrical conductor and cured, resinous insulation applied to the conductor, the resinous insulation comprising the heat reaction product of a glycidyl polyether of a dihydric phenol and an epihalohydrin, said polyether having a 1,2-epoxy equivalency greater than 1, and from 4% to 40% by weight, based on the weight of the polyether, of at least one N-substituted diethanolamine boronate ester having the structural formula wherein R represents a radical selected from the group consisting of alkyl radicals having from 1 to 4 carbon atoms, phenyl, halogenated phenyl, methyl-phenyl, benzyl, cyclopentyl, and cyclohexyl radicals, and R' represents radicals selected from the group consisting of hydrogen, alkyl radicals having from 1 to 4 carbon atoms, phenyl, halogenated phenyl, methyl-phenyl, benzyl, cyclopentyl, and cyclohexyl radicals.

8. An insulated electrical member as set forth in claim 7 wherein the resinous insulation contains finely divided inorganic filler material.

References Cited in the file of this patent

UNITED STATES PATENTS

| | | |
|---|---|---|
| 2,260,338 | Prescott et al. | Oct. 28, 1941 |
| 2,324,483 | Castan | July 20, 1943 |
| 2,785,192 | Ebling et al. | Mar. 12, 1957 |
| 2,817,644 | Shokal et al. | Dec. 24, 1957 |
| 2,871,454 | Langer | Jan. 27, 1959 |